United States Patent [19]

Hyde

[11] 4,411,287

[45] Oct. 25, 1983

[54] VALVE-TYPE CLOSURE FOR CONTAINERS

[75] Inventor: Roger J. Hyde, Kettering, England

[73] Assignee: Alumasc Limited, London, England

[21] Appl. No.: 254,932

[22] Filed: Apr. 16, 1981

[30] Foreign Application Priority Data

Apr. 22, 1980 [GB] United Kingdom ................. 8013176

[51] Int. Cl.$^{3}$ ........................ F16K 51/00; F16L 37/00; B65D 83/00

[52] U.S. Cl. .................................... 137/315; 137/212; 137/322; 222/400.7; 251/149.6; 251/149.9; 220/316; 220/319

[58] Field of Search ........................ 137/212, 315, 322; 222/400.7; 220/316, 319, 320; 251/149.6, 149.9

[56] References Cited

U.S. PATENT DOCUMENTS

| | | | |
|---|---|---|---|
| 3,231,154 | 1/1966 | Johnston | 222/400.7 |
| 3,353,724 | 11/1967 | Johnston | 137/212 |
| 3,473,556 | 10/1969 | Johnson et al. | 137/322 |
| 3,596,810 | 8/1971 | Taubenheim | 137/212 |
| 4,181,143 | 1/1980 | Fallon | 137/322 |

FOREIGN PATENT DOCUMENTS

| | | | |
|---|---|---|---|
| 1265427 | 12/1971 | United Kingdom | 137/212 |
| 1402631 | 8/1975 | United Kingdom | 137/212 |

*Primary Examiner*—George L. Walton
*Attorney, Agent, or Firm*—Ron B. Moffitt

[57] ABSTRACT

In order to reduce the risk of inadvertent removal from an internally-pressurized cask or keg of a valve-type closure through which the contents are discharged, the valve body (15, 16) has rotationally-mounted on it an axially-trapped sleeve (23) which is threaded into the usual fixed socket (11) on the cask or keg. As the sleeve is screwed in, a peg (24) on the body enters a channel (25) in the socket to guide the body axially into the socket. On attempted removal of the sleeve (23) without a special tool to restrain rotation of the body in the unscrewing direction, the body tends to rotate in the unscrewing direction and the peg (24) enters a blind-ended passage (27) so preventing removal of the closure. However, the body moves axially sufficiently to open a gas-relief passage from the cask or keg to atmosphere.

8 Claims, 5 Drawing Figures

VALVE-TYPE CLOSURE FOR CONTAINERS

The invention relates to valve-type closures for metal containers, such as kegs or casks as used for the storage of beers, carbonated soft drinks and other liquids under pressure, the closure permitting dispensing through it of the liquid from the container.

It is a common arrangement that the container has welded to it a tubular neck-like socket into which the valve type closure is inserted, the socket and closure body having mating screw threads or a bayonet type connection. Such arrangements are generally satisfactory in practice, but have a disadvantage that it is possible inadvertently to unscrew the closure or disengage the bayonet connection whilst the container is pressurised internally. This dangerous possibility may occur for example when attempting to disengage from the closure a dispense head by which connection is made between the container and a dispense tap.

In another arrangement, the closure is merely retained by a split ring which engages a groove internally of an annular cask fitting and overlies shoulders on the closure body. The split ring is usually readily accessible and can be removed easily using a tool, e.g. a screw driver. If this is done when the container is pressurised internally, the closure will be ejected with great force.

The invention provides an arrangement by which the above difficulties may be avoided.

According to the invention, a closure arrangement for a keg or cask comprises an internally screw-threaded neck-like socket to be rigidly secured to the keg or cask and a valve closure to be fitted in the socket and the valved closure has a body housing thereon a valve, an externally screw-threaded sleeve rotatable on the body to be screwed in use into the socket to displace the body axially into the socket, a guiding connection between the socket and body, which connection guides the body axially into the socket on screwing in of the sleeve and is adapted to engage body-retaining means in the event of rotation of the body in the sleeve unscrewing direction, and a gas-relief passage which is closed on full entry of the body into the socket and is opened on engagement of the body-retaining means.

In one particular arrangement, the guiding means comprises a peg on the body and co-operating recessing in the internal surface of the socket, the recessing having an entry channel to guide the peg axially on screwing in of the sleeve and a blind-ended channel forming the retaining means and extending in the unscrewing direction from adjacent the inner end of the entry channel.

The arrangement is such that on screwing the sleeve into the socket, the peg on the closure body travels along the entry channel to the junction of the blind-ended channel and the gas-relief passage is closed by axial displacement of the body into the socket, and that, if an attempt is made to unscrew the sleeve without simultaneously rotating the body in the screwing-in direction, e.g. clockwise for right-hand screw threading, the peg enters the blind-ended channel to prevent closure ejection and the gas-relief passage is opened. Removal of the closure is effected by special tool which rotates the sleeve and body relatively in opposite directions so preventing engagement of the retaining means.

Constructions of closure embodying the above and other inventive features are, by way of example only, described below and shown on the accompanying drawings, in which.

Figure 1:
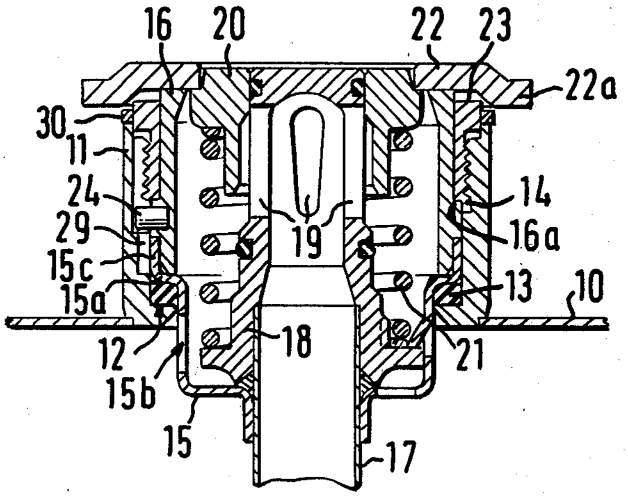
FIG. 1 is an axial section through a closure fitted in a container socket.

In both constructions, the container wall 10 has welded to it a socket 11 which has at its inner end a shoulder 12 for a sealing ring 13 and at its outer end an internal right-handed screwthread 14.

The valve-type closure comprises a body in two separable tubular parts 15,16. The part 15 has a flange **15*a* to seat on the sealing ring 13, a series of holes 15*b* giving access to the container interior when the closure is in place, and an axial extension 15*c* of flange 15*a* to fit snugly outside the inner end of the part 16. The part 15 has secured to it a dip pipe 17 and a fitting 18 constituting an extension of the pipe 17 and having in it a series of ports 19 which are controlled by a sliding valve member 20 urged by spring 21 against a seat 22** to close the valve.

The seat 22 is formed by a pressing which is welded to the outer end of the part 16 of the body. The part 16 is tubular and bears on the flange **15*a* to transmit sealing pressure to the sealing ring 13**.

Figure 2:
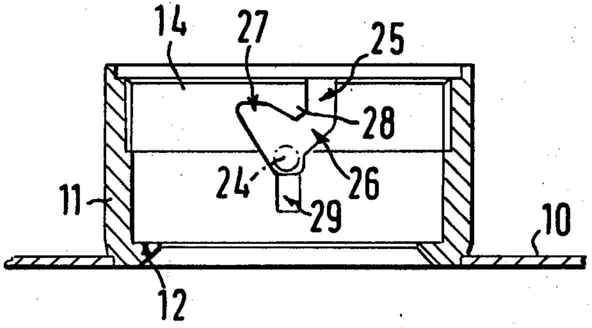
FIG. 2 is a view of the internal surface of the socket with the closure removed.

To secure the closure in position, the following arrangement is adopted in this construction of FIGS. 1 and 2.

An externally-threaded sleeve 23 is mounted on the body part 16 so as to be rotatable on it, the sleeve 23 being trapped against removal from the body part 16 by a shoulder **16*a* on the part 16 and by the pressing which has a radial extent to overlie the sleeve and to provide a flange 22*a* extending outwards beyond the end of the socket 11. As will be appreciated screwing the sleeve 23 into the socket thread 14 displaces the body part 16 axially so pressing the flange 15*a* against the sealing ring 13 to compress it so preventing leakage between the socket and closure. In the fully screwed-in position (FIG. 1) the holes 15*b* are below the sealing ring 13**.

In order to prevent inadvertent unscrewing of the sleeve 23 allowing pressure ejection of the closure, the following arrangement is provided.

A peg 24 is fitted into the side of the body part 16 to project into channelling in the inside surface of the socket 11.

As seen from FIG. 2, the channelling comprises an axial entry channel 25 which at its inner end has an anti-clockwise extension 26. The inner end of this extension opens into a blind-ended channel 27 which extends anti-clockwise and axially outwards from the channel extension 26.

On screwing in of the sleeve 23 the peg 24 enters the channel 25 and travels inwards to the channel extension 26 until the peg is opposite the tongue of metal 28 separating the channels 25 and 27. This action prevents the body of the closure from rotating with the sleeve 23 so preventing damage to the sealing ring 13 by relative rotation of the sealing parts 15, 12.

If now an attempt is made to unscrew the sleeve 23, without the use of a special tool, the peg 24 in the body part 16 rises up into the blind-ended channel 27 so trapping the closure against ejection.

It will be seen that there is a gas-relief passage 29 extending downwards from the channelling just described. When the closure is properly positioned the passage 29 is sealed off from the interior of the container 10, but, when the sleeve 23 is sufficiently unscrewed to cause the peg 24 to enter channel 27, either the sealing ring 13 sticks to the flange 15*a* and clears the inner end of the passage 29 and the holes 15*b* overlap the shoulder 12 so allowing gas escape through the channelling, or if the sealing ring remains on the shoulder 12 the holes 15*b* overlap both the shoulder 12 and ring 13 providing communication between the interior of the container and passage 29 allowing gas escape.

Gas pressure relief also clearly occurs if the closure is being removed using the appropriate tool which must be able to rotate the body part 16 clockwise into channel extension 26 whilst simultaneously unscrewing sleeve 23 by anti-clockwise rotation.

It will be appreciated that even unscrewing the sleeve 23 without the proper tool can be difficult because of the presence of flange 22*a* and removal by inexperienced persons can be further hampered by a split ring 30 which is mounted on the socket 11 prior to closure insertion and is then slid axially until it sits on the outer end of the sleeve 23 and masks any tool engagement features.

Figure 3:
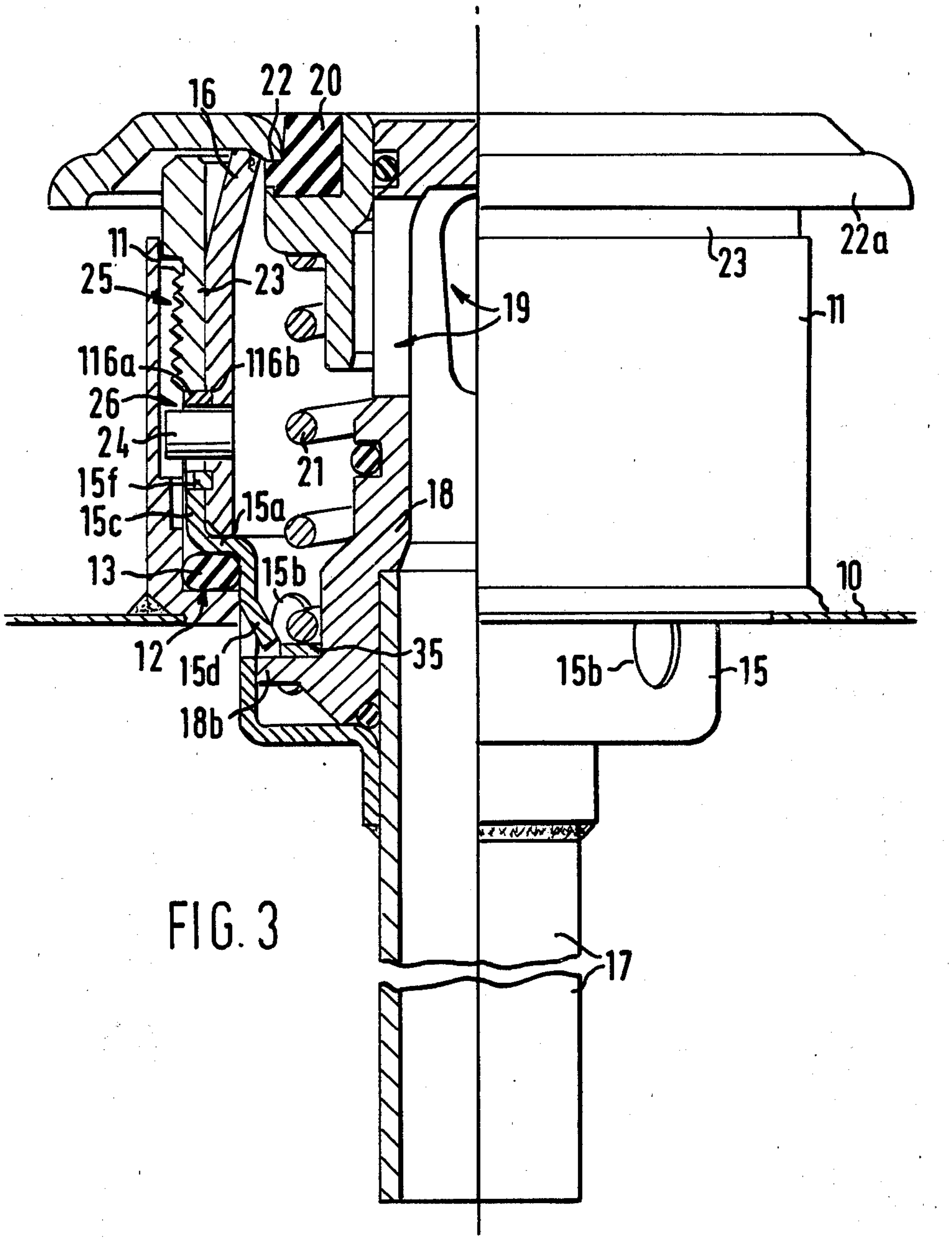
FIG. 3 is a view partly in section of a second form of closure.
Figure 5:
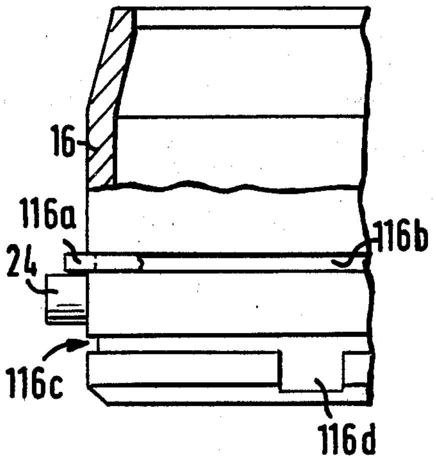
FIG. 5 shows a detail of the closure of FIG. 3.
Figure 4:
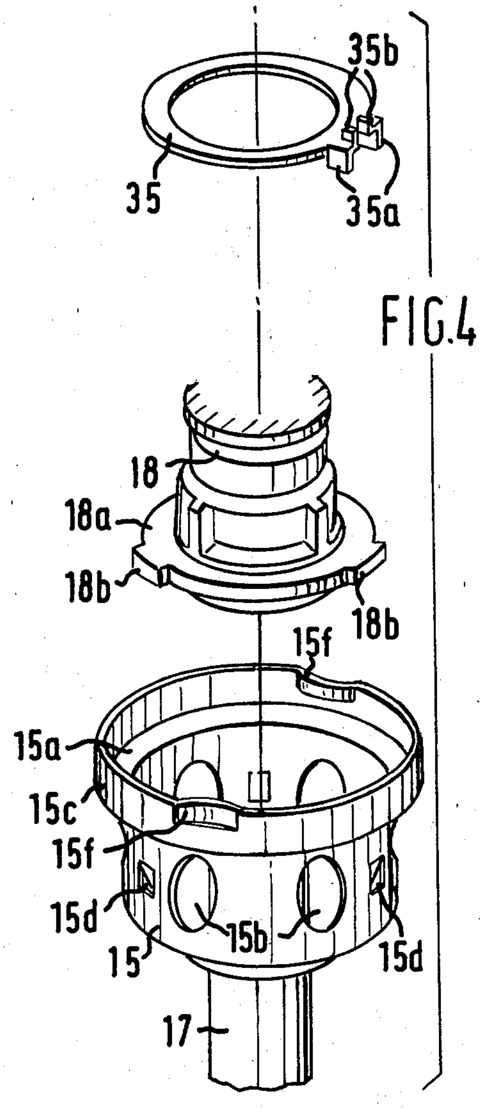
FIG. 4 is an exploded view of parts of FIGS. 3.

Referring now to the closure construction of FIGS. 3 to 5, the same safety arrangement is used as in FIGS. 1 and 2 and the references used in FIGS. 1 and 2 are employed to indicate corresponding parts of FIGS. 3 to 5. However the closure of FIGS. 3 to 5 comprises a number of modifications which will now be described.

Firstly to simplify assembly, instead of the shoulder 16*a* of FIGS. 1 and 2, there is provided a spring circular clip 116*a* which is located in a circumferential groove 116*b* (FIGS. 3 and 5) formed in the part 16. The threaded sleeve 23 is trapped axially between the clip 116*a* and the flange 22*a* (FIG. 3).

Secondly in order to prevent relative rotation between the part 15 and the fitting 18, there is provided (FIGS. 3 and 4) a locating washer 35 which is held by the spring 21 against a flange 18*a* at the lower end of the fitting 18. The washer 35 has a pair of circumferentially-spaced depending and radially-projecting lugs 35*a* between which fits one of a number of lugs 18*b* projecting from the flange 18*a*. The washer 35 has also a pair of circumferentially-spaced upward and radially-projecting lugs 35*b* between which fits one of a number of lugs 15*d* struck out from the wall of the part 15. With the washer 35 in position, the lugs 35*a* and 35*b* prevent rotation between the parts 18 and 15.

Thirdly, in order to retain the closure as a unit when removed from the keg or cask, the part 16 is formed with a circumferential groove 116*c* (FIG. 5) and a number of flats 116*d* leading into the groove. The part 15 (FIGS. 3, 4) has a pair of inward projections 15*f* which are struck out from the top edge of the axial extension 15*c* of the part, and which can be fed past the flats 116*d* and by rotation entered into the groove 116*c* so joining the part 15 to the part 16 and preventing their inadvertant separation when free of the keg or cask.

I claim:

1. A closure arrangement for a metal container comprising in combination a neck adapted to be rigidly secured to said container, a screw-threaded socket internally of said neck, and a valved closure to be screw-threaded into said socket; a construction of said valved closure comprising a tubular body, a closure valve housed within said body to control fluid flow therethrough, a sleeve rotatably mounted exteriorly on said body, means locating said sleeve against axial displacement of said sleeve on said body, said sleeve having an external screw-thread to engage said internal screw-thread of said socket, and a guiding connection between said tubular body and said neck to restrict rotation of said body in said neck and allowing axial travel of said body into said neck to a fully-inserted position on screwing-in of said sleeve, and said guiding connection including body-retaining means operative to limit axial travel of the body from the fully-inserted position on occurrence of rotation of the body in the neck in the unscrewing direction on unscrewing the sleeve; and pressure-gas relief means including a gas passage, and a seal operative to close the gas passage in said fully-inserted position of the body, said gas passage being opened around said seal on travel of the body axially from the fully-inserted position.

2. A closure arrangement according to claim 1, said guiding connection comprising a peg projecting from the body and engaging recessing in the socket; said recessing comprising an entry channel to guide the peg axially on screwing-in of said sleeve and a blind-ended channel extending in the unscrewing direction from the inner end of the entry channel for trapping the peg on rotation of the body in the sleeve-unscrewing direction relatively to the sleeve.

3. A closure arrangement according to claim 2, said gas passage comprising an extension of said entry channel from its inner end and ports in the body, said seal isolating said channel extension from the ports when the body is in the fully-inserted position but permitting said ports to open into the channel extension on axial displacement of the body from the fully-inserted position.

4. A closure according to claim 1 or claim 2 or claim 3, said body being in separable inner and outer tubular parts, there being an outward flange at the outer end of the outer part and a shoulder at the inner end of the outer part, the sleeve being trapped axially between said flange and said shoulder.

5. A closure according to claim 1 or claim 2 or claim 3, said body being in inner and outer tubular parts, there being an outward flange at the outer end of the outer part and a spring circular clip received in a groove at the inner end of the outer part, said sleeve being trapped between said flange and said spring circular clip.

6. A closure according to claim 5, said separable inner and outer tubular parts being connected by projections on the inner part entering circumferential grooving in the outer part.

7. A closure according to claim 1 or claim 2 or claim 3, comprising a flange on the body at its outer end, said flange extending radially outwards beyond the neck thereby to overlie the neck and mask the sleeve and valve body.

8. A closure according to claim 1 or claim 2 or claim 3, there being a down tube carried by the valve body, a down tube extension within the valve body, a locating washer interconnecting said valve body and said down tube extension, said washer having pairs of circumferentially-spaced lugs, and said valve body and said down tube extension having lugs engaged between said pairs of lugs to hold the body and extension against relative rotation.

* * * * *